United States Patent [19]

Aoki

[11] Patent Number: 5,757,315
[45] Date of Patent: May 26, 1998

[54] GPS RECEIVING APPARATUS

[75] Inventor: Akihiro Aoki, Kanagawa, Japan

[73] Assignee: Sokkia Company Limited, Tokyo, Japan

[21] Appl. No.: 686,575

[22] Filed: Jul. 26, 1996

[30] Foreign Application Priority Data

Sep. 22, 1995 [JP] Japan .................. 7-244256

[51] Int. Cl.$^6$ .............. G01S 5/02; H04B 7/185
[52] U.S. Cl. .............. 342/357; 701/213
[58] Field of Search .............. 342/357, 352; 364/449.7

[56] References Cited

U.S. PATENT DOCUMENTS

| | | | |
|---|---|---|---|
| 4,247,843 | 1/1981 | Miller et al. | 340/27 NA |
| 4,263,726 | 4/1981 | Balton | 434/43 |
| 5,574,465 | 11/1996 | Okada | 342/352 |
| 5,630,718 | 5/1997 | Montag et al. | 434/2 |

FOREIGN PATENT DOCUMENTS 6301446  10/1994  Japan .

*Primary Examiner*—Thomas H. Tarcza
*Assistant Examiner*—Dao L. Phan
*Attorney, Agent, or Firm*—Sixbey Friedman Leedom & Ferguson; Thomas W. Cole

[57] ABSTRACT

A GPS receiving apparatus is equipped with a GPS receiver 10, a data decoder 12, data memory means 14, a CPU 16, a display 18 and an input pen 20. The display 18 is provided with a digitizing function to allow input by drawing of data with the input pen 20. A sky diagram image 24 serving as the input screen consists of a circular figure the perimeter of which represents the horizon and the center of which is considered as the zenith, and after the observer aligns the sky diagram image 24 with the observation point, the input pen 20 is used to draw images (a), (b) and (c) of the shape of and the proportion of sky occupied by obstacles such as buildings, trees and mountains within the field of view of the area based on the elevation angle of the observer himself, and the images are incorporated into the CPU 16 as obstacle-related data.

3 Claims, 3 Drawing Sheets

5,757,315

GPS RECEIVING APPARATUS

BACKGROUND OF THE INVENTION

The present invention relates to a GPS receiving apparatus designed to allow pen-based inputting of information on obstacles to reception of radio signals at surveying observation sites.

GPS systems are systems which receive, on land, radio waves transmitted from a plurality of satellites revolving in orbit around the earth and then calculate the position of the reception site on the earth, and such systems have recently found a wider range of users, such as for automobile navigation and surveying.

GPS receiving apparatuses used for these kinds of applications generally include a GPS receiver which receives radio signals transmitted from a plurality of satellites, a data decoder which decodes the radio signals received by the GPS receiver and creates reception data such as carrier wave phase data, satellite identification codes, time data, etc., and a data memory means which records the reception data decoded and created by the data decoder.

Incidentally, when surveying is conducted using a GPS receiving apparatus, it is necessary to simultaneously receive radio signals from at least four separate satellites for observation periods of a few hours, and the mutual positional relationship between the satellites must be satisfactory; consequently, an observation plan is established in advance whereby satellites are selected from which reception is possible at the observation site, and the times for receiving the radio signals from the four selected satellites are determined.

Since the conditions at the observation site must be known in order to carry out the observation plan, it has been common to travel beforehand to the observation site to observe the surrounding conditions. That is, depending on the conditions at the observation site there may be, for example, buildings, trees or mountains in the area obstructing reception of radio waves, and therefore an advance examination has been necessary to investigate the location and height of such obstacles, and determine which satellites and reception times will allow reliable reception.

Nevertheless, a technical problem has been associated with conventional means for carrying out observation plans, as explained below.

Specifically, actual devising of the observation plan with the means described above for carrying out observation plans has involved on-site sketching of information such as the location and height of obstacles observed at the observation site, or bringing back written notes on the azimuths and elevation angles of the obstacles, entering this information in a computer, and then allowing computer processing to select the receivable satellites and determine the reception times; such operations, however, have been extremely time-consuming, susceptible to input errors, and have resulted in certain inconveniences such as failure to employ satellites in the most suitable orbits and utilizing reception times at which satellites overlap with obstacles.

The present invention overcomes the aforementioned problems, and it is therefore an object of the invention to provide a GPS receiving apparatus which allows input at an observation site of information relating to obstacles capable of influencing the observation plan, in a form that may be data-processed.

SUMMARY OF THE INVENTION

In order to accomplish the above-mentioned object, the present invention provides a GPS receiving apparatus equipped with a GPS receiver which receives radio signals transmitted from a plurality of satellites, a data decoder which decodes the radio signals received by the GPS receiver and creates reception data such a carrier wave phase data, satellite identification codes, time data, etc., and data memory means which records the reception data decoded and created by the data decoder, which is characterized by having a display which displays a sky diagram image on a screen and is provided with a digitizer function to convert the displayed image into digital information, and pen-based input means for drawing obstacle-related information on the sky diagram image.

Since the GPS receiving apparatus with the construction described above is equipped with a display which displays a sky diagram image on a screen and is provided with a digitizer function to convert the displayed image into digital information, and pen-based input means for drawing obstacle-related information on the sky diagram image, the observer at the observation site may use a pen to draw obstacle-related information such as the shape and position of obstacles and the proportion of sky occupied thereby, as if drawing a note according to the prior art, which information may be converted into processable obstacle-related data.

The above-mentioned GPS receiving apparatus may also be provided with a processing unit which calculates the orbit of each satellite based on the reception data, makes a flight prediction calculation, and displays it on the display.

According to this construction, since the GPS receiving apparatus is provided with a processing unit which calculates the orbit of each satellite based on the reception data, makes a flight prediction calculation, and displays it on the display, it is possible to establish and revise observation plans at the observation site.

As described above, the GPS receiving apparatus according to the present invention allows obstacle-related information on the shape and position of obstacles, the proportion of sky occupied thereby, etc., to be inputted at the observation site by the observer using a pen as if drawing notes in the same manner as according to the prior art, and then conversion of the obstacle-related information into digitized obstacle-related data; as a result there are provided the advantages of more convenient input of obstacle-related information by the hand of the operator and thus savings in labor, as well as higher accuracy of information.

An advantage of the invention is to obtain digitized obstacle-related data with a GPS receiving apparatus at observation sites.

BRIEF DESCRIPTION OF THE DRAWINGS

In order that the apparatus in which the above-recited objects and advantages of the invention are achieved can be understood in detail, a more particular description of the invention will now be made by reference to specific embodiments thereof which are illustrated in the accompanying drawings, which form a part of this specification.

In The Drawings.

DESCRIPTION OF THE PREFERRED EMBODIMENT OF THE INVENTION

Figure 1:
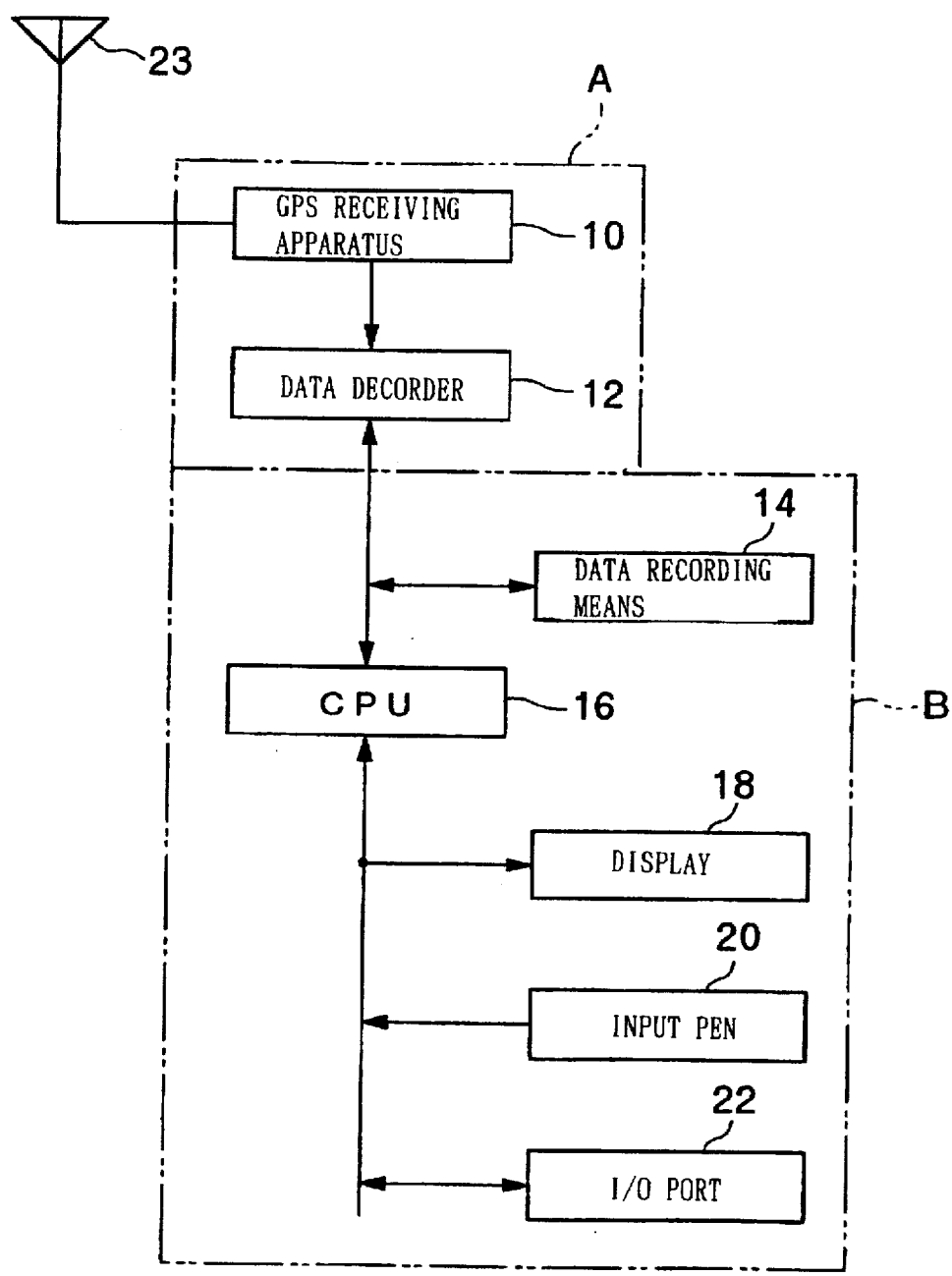
FIG. 1 is a block diagram of the system configuration of a GPS receiving apparatus according to the invention.

A preferred embodiment of the invention will now be explained in detail with reference to the accompanying drawings. FIG. 1 is an illustration of a GPS receiving apparatus according to the invention. The GPS receiving apparatus shown here is equipped with a receiving apparatus body A and a processing unit B. The receiving apparatus body A is provided with a GPS receiver 10 and a data decoder 12.

The processing unit B is provided with a data memory means 14, a CPU 16, a display 18, an input pen 20 and an I/O port 22. The GPS receiver 10 is connected to an antenna 23, and the GPS receiver 10 receives radio signals transmitted from a plurality of satellites through the antenna 23. Here, one satellite is assigned to each of a plurality of receiving channels provided in the GPS receiver 10.

The data decoder 12 decodes radio signals received at the GPS receiver 10, and creates reception data, such as carrier wave phase data, satellite identification codes unique to each satellite, periodically updated orbital data relating to semi-major axes and eccentricity of orbits, time data, ionospheric compensation data, and the like.

The data memory means 14 records all data taken in including carrier wave phase data, time data, satellite identification codes and orbital data which has been decoded and created at the data decoder 12 through the CPU 16, and stores various processing programs.

The CPU 16 reads orbital data recorded in the data memory means 14, makes a predictive calculation of the current or future position of each satellite relative to the arranged point of observation, and creates flight prediction data for each satellite, displaying the calculation results on a display 18 via a table or figure.

The display 18 may be, for example, a large-size liquid crystal display which is equipped with a digitizer function; data may be drawn with the input pen 20, and the contents drawn with the input pen 20 are then converted by the digitizer function into computer-processable digital data.

The I/O port 22 is connected to, for example, a magnetic card reader/writer, through which previous reception data which has been recorded on a magnetic card is inputted, and the CPU 16 makes predictive calculations from the previous position of each satellite relative to the arranged observation point to create flight prediction data for the satellite.

Carrier wave phase data, time data, satellite identification codes and orbital data which has been decoded at the data decoder 12 and recorded by the data memory means 14 is written onto a magnetic card via the reader/writer, and a computer installed at a separate location is used to calculate the orbit of the satellites and the positional coordinates of the observation site.

Figure 2:
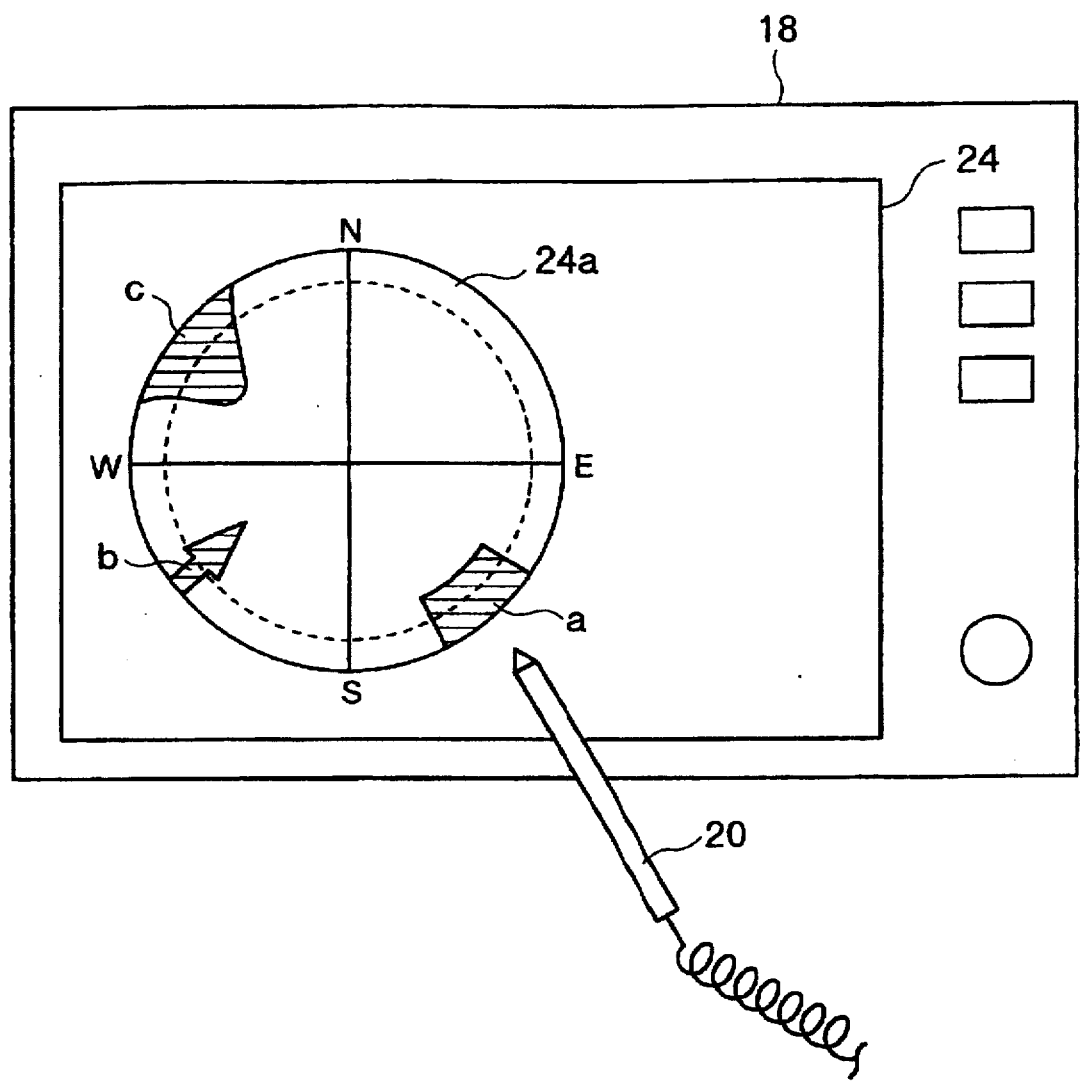
FIG. 2 is an illustration of a sky diagram image displayed on the display of the receiving apparatus.

FIG. 2 shows a preferred embodiment of contents displayed on a display 18 when the input pen 20 is used to input the surrounding conditions at an arranged observation point. In FIG. 2, a circular figure displayed at the center of the display 18 is a sky diagram image 24, and this sky diagram image 24, the perimeter of which represents the horizon, is separated into 4 sections by a display of orthogonal east-west and north-south directional lines, with the intersection of the directional lines considered to be the zenith.

Also, a prescribed zone of the sky diagram image 24 is marked in advance inside the circular figure as a section in which radio signals from satellites cannot be received, representing the range of an elevation angle from the horizon of, for example, about 15°, and this zone is indicated with a prepositioned masking line 24a.

At the arranged observation point, an observer uses a compass to align the displayed sky diagram image 24 with the observation point, and then uses the input pen 20 to input a drawing of the shape of and the proportion of sky occupied by obstacles such as buildings (a), trees (b) and mountains (c) within the field of view of the area, based on the elevation angle and measurements by the observer himself.

When obstacle-related information is inputted in this manner as a drawing with the input pen 20, the obstacle-related information is then stored in the data memory means 14 as digitized obstacle-related data on the position, size and height of the obstacles. The CPU 16 makes a flight prediction calculation based on the above-mentioned reception data, and displays the contents thereof on the display 18.

Figure 3:
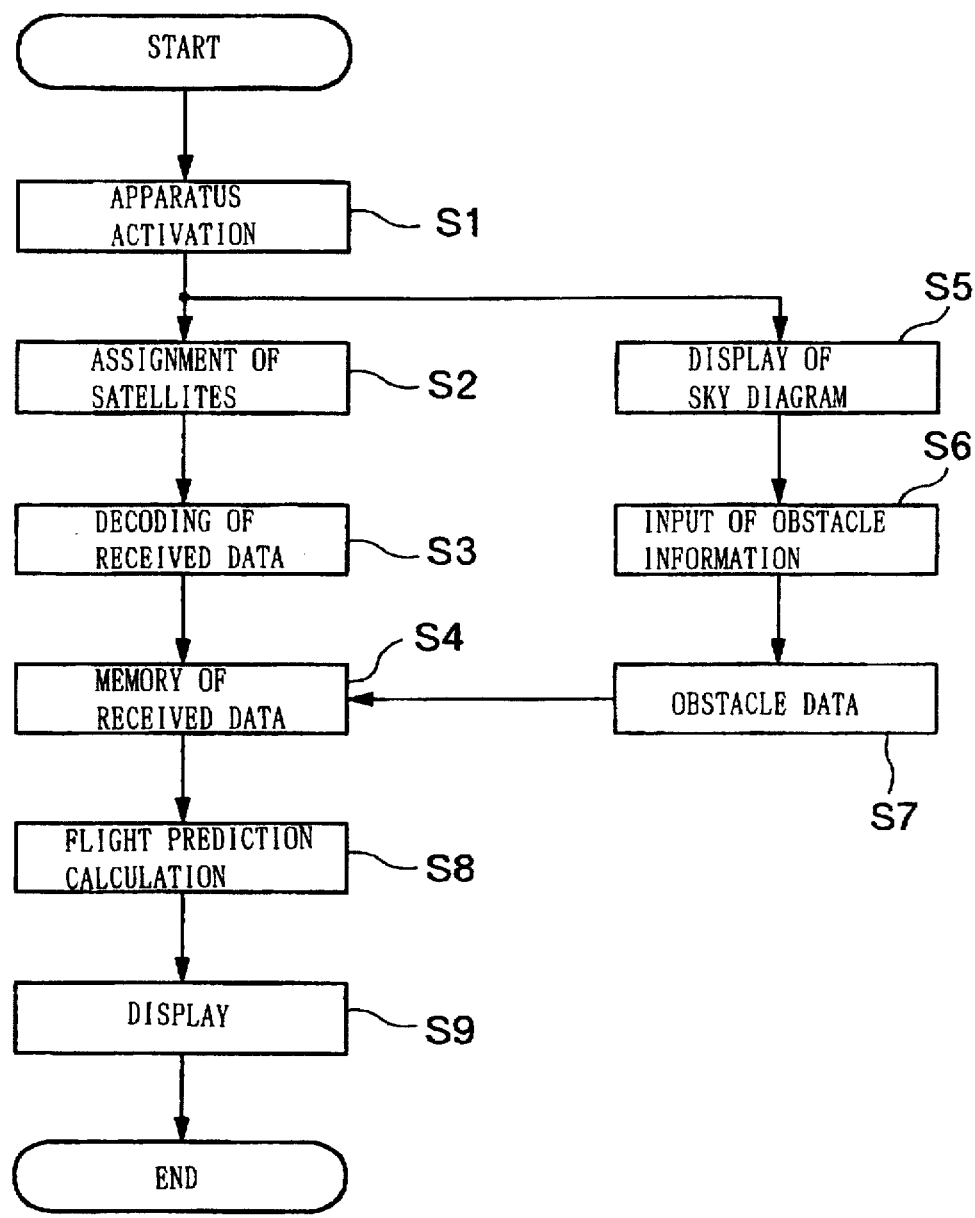
FIG. 3 is a flow chart showing a preferred embodiment of a processing procedure wherein a flight prediction calculation is made and displayed.

FIG. 3 shows the procedure followed when a satellite flight prediction is calculated by the CPU 16 of a GPS receiving apparatus having the construction described above. In the procedure shown here, the apparatus body is first activated (step S1. In step S2, the GPS receiver 10 assigns the channels of the satellites whose signals are to be received.

The assigning of the satellites is carried out, for example, either manually or automatically based on the orbital information or satellite survey. Once assigning of the satellites has been completed, radio signals are received from the satellites through the antenna 22, and then in step S3 the currently received data is decoded by the data decoder 12 at the GPS receiver 10.

At the data decoder 12, the radio signals received at the GPS receiver 10 are decoded, and reception data such as carrier wave phase data, satellite identification codes unique to each satellite, periodically updated orbital data relating to semi-major axes and eccentricity of orbits, time data, ionospheric compensation data, etc. are created, after which the reception data is stored in the data memory means 14 in the subsequent step S4.

Meanwhile, when the apparatus is activated in step S1, the sky diagram image 24 shown in FIG. 2 is displayed on the display 18 in step S5. Once the sky diagram image 24 has been displayed on the display 18, the observer may input a drawing of obstacle-related information with the input pen 20 while viewing the surrounding conditions (step S6).

When obstacle-related information is inputted with the input pen 20 on the display 18, it is converted into digitized obstacle-related data (step S7) by the display 18 which is provided with a digitizing function, and the converted obstacle-related data is then stored in the data memory means 14.

Once the reception data and obstacle-related data have been recorded in the memory means 14, the CPU 16 first determines the position of each satellite relative to the arranged observation point based on the reception data from each satellite from which a signal is currently being received. The operational expression for determining the position is in the form of a previously prepared program recorded in the memory means 14. Once the position of each satellite has been determined, a flight prediction calculation is made based on the time data and orbital data (step S8) and the result is displayed on the display 18 (step S9), upon which the procedure is ended.

The contents displayed on the display 18 at this time are the result of superimposing flight prediction conditions for each satellite over the sections in which the obstacles (a), (b) and (c) are indicated in the sky diagram image 24a shown in FIG. 2, and since overlapping satellites and overlapping time zones are included in the obstacle-related data, depending on the elevation angle of the satellites, the displayed contents may be viewed to select the satellites which allow the best observation without obstruction by obstacles, and to set the appropriate observation time zones.

In the example described above, the flight prediction calculation was made by the CPU 16 at the observation site, and this type of construction makes it possible to establish observation plans and revise previously devised observation plans at the observation site itself.

Also, for carrying out the present invention, it is not always essential to calculate flight predictions at the observation site, and as an alternative input may be made at the site, and the digitized obstacle-related data and reception data carried elsewhere for processing at a separate computer.

What is claimed:

1. A GPS receiving apparatus equipped with a GPS receiver which receives radio signals transmitted from a plurality of satellites, a data decoder which decodes said radio signals received by said GPS receiver and creates reception data, and a data memory means which records the reception data decoded by said data decoder, comprising means for displaying a sky diagram image on a screen, said means having a digitizer function to convert the displayed image into digital information, and pen-based input means for drawing obstacle-related information on said sky diagram image.

2. The GPS receiving apparatus of claim 1, further comprising a processing unit which calculates the orbit of each satellite from said reception data, makes a flight prediction calculation, and displays it on said display.

3. A method of operating a GPS receiving apparatus equipped with a GPS receiver which receives radio signals transmitted from a plurality of satellites, a data decoder which decodes said radio signals received by said GPS receiver and creates reception data, a data memory means which records the reception data decoded by said data decoder, and a display having a screen for displaying a sky diagram image and a digitizer function to convert the displayed image into digital information, comprising the step of:

drawing obstacle-related information on the screen displaying the sky diagram image with a pen-based input means.

* * * * *